Feb. 24, 1959 A. G. MENTES 2,874,621
AGGREGATE SPREADER WITH VERTICALLY AND
HORIZONTALLY ADJUSTABLE WHEELS
Filed July 11, 1956 3 Sheets-Sheet 2
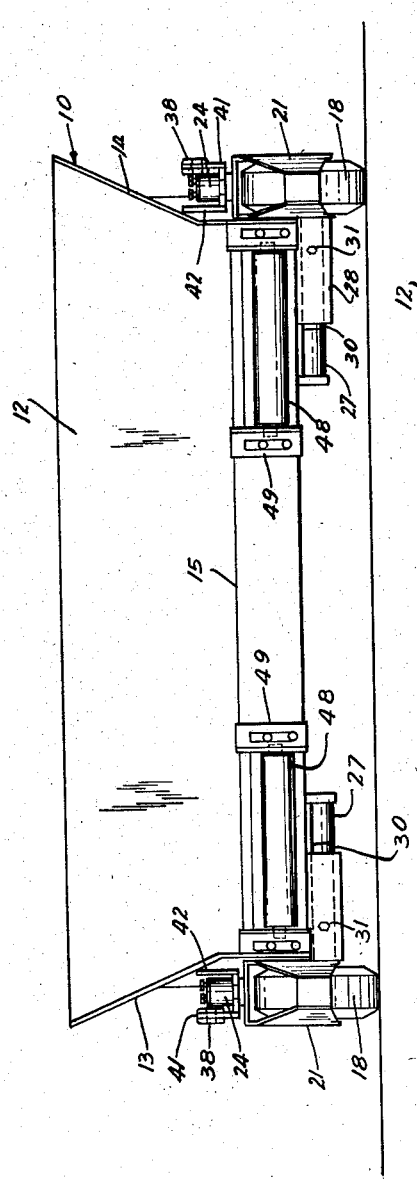
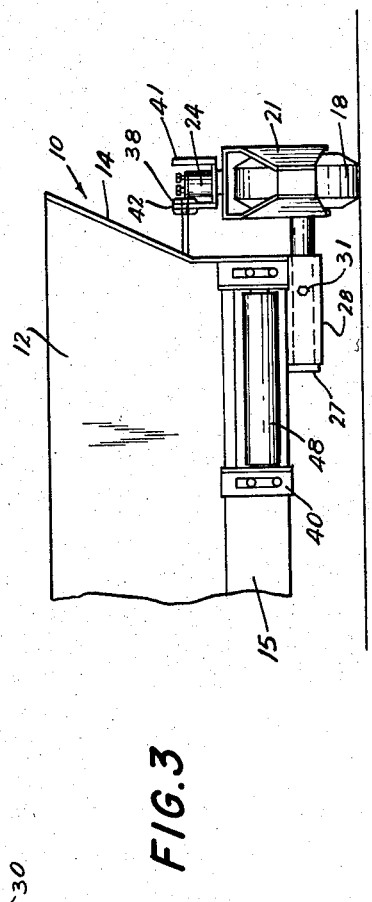
INVENTOR.
ALEXANDER G. MENTES
BY
ATTORNEYS

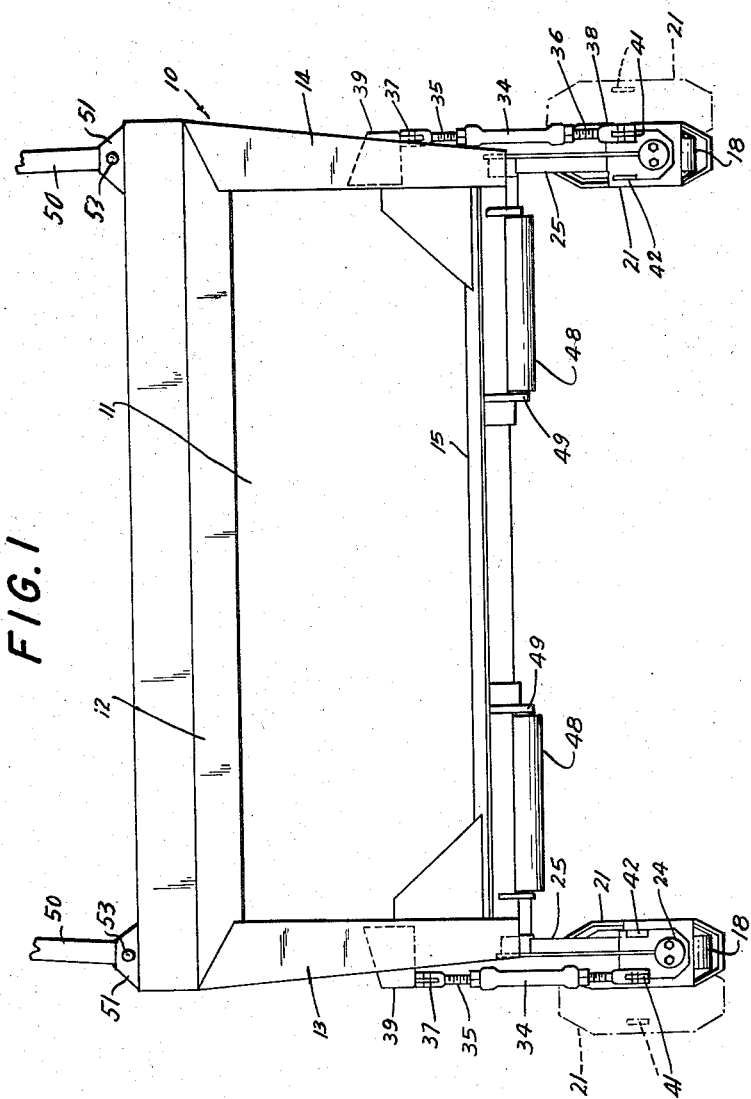

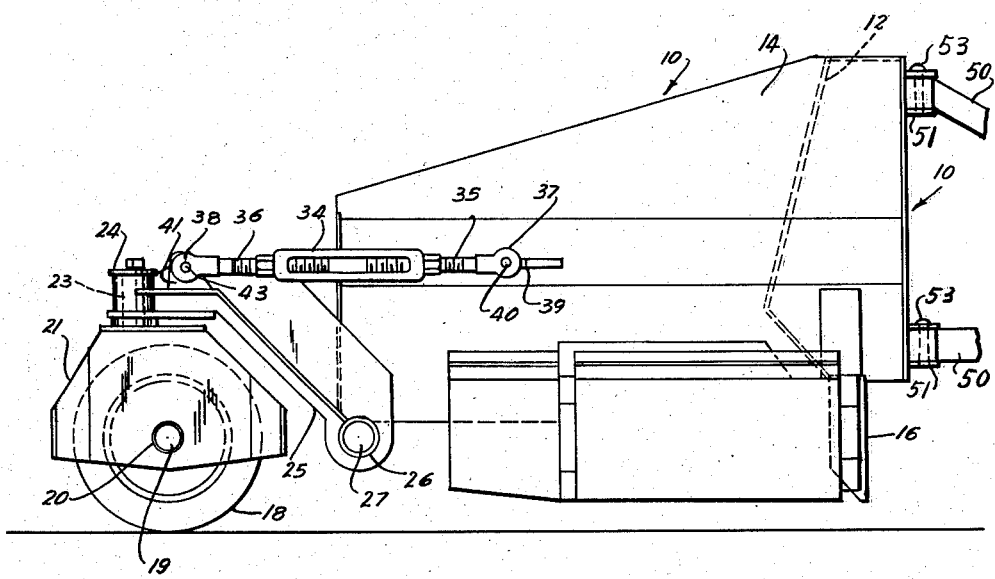
FIG.4
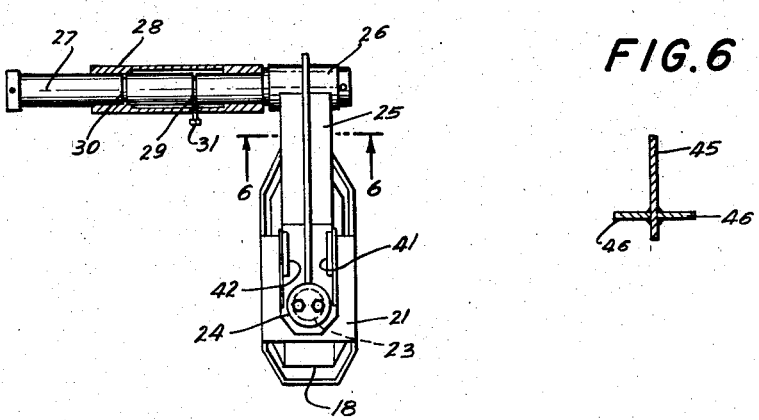
FIG.5
FIG.6

2,874,621
AGGREGATE SPREADER WITH VERTICALLY AND HORIZONTALLY ADJUSTABLE WHEELS

Alexander G. Mentes, Hasbrouck Heights, N. J.

Application July 11, 1956, Serial No. 597,174

2 Claims. (Cl. 94—46)

This invention relates to a spreader for spreading a layer of loose aggregate as a base for roadways, parking lots, aircraft runways and the like. The spreader is mounted on wheels arranged forwardly one on each side and as the spreader is pushed by means of a tractor, the loose aggregate is discharged at the rear beneath a strike-off blade.

The wheels of the spreader constitute a continuing means of reference for the height of the strike-off blade from the surface of the area on which the aggregate is to be spread. Due to the disparity between the width of the spreader and the width of the area on which the aggregate is to be spread, a constant plane of reference is not maintained at all times since the wheels ride on surfaces at different elevations. For instance, in the spreading of aggregate for shoulders at the side of the road, one of the wheels of the spreader may travel on a previously laid strip or in a ditch or on higher ground than the other wheel. Thus, the strike-off blade is thrown out of horizontal alignment with the surface to be spread.

In order to overcome this condition, the present invention provides means by which either one of the wheels of the spreader may be raised or lowered to permit of the wheel traveling on a higher or lower surface than the other wheel whereby the body of the spreader is maintained substantially horizontal for spreading a uniform thickness of aggregate and with the upper surface thereof in a substantially uniform plane.

Another object of the invention is to provide means by which either one of the wheels may be moved laterally for rolling engagement on desired reference surface so as to maintain the body of the spreader in horizontal relation with the surface of the area to be spread with aggregate.

Still another object of the invention is to provide a spreader in which the wheels are adjustable horizontally and vertically for the purpose of maintaining the strike-off blade at all times in the same spaced relationship from the area on which the aggregate is to be spread.

With the foregoing and other objects in view, reference is now made to the following specification and accompanying drawings in which the preferred embodiment of the invention is illustrated.

In the drawings:

Fig. 1 is a top plan of a spreader constructed in accordance with the invention.

Fig. 2 is a view in front elevation thereof showing the wheels disposed in the inner position.

Fig. 3 is a fragmentary front view showing one of the wheels in the outer position.

Fig. 4 is a side view of the spreader.

Fig. 5 is a top plan view of one of the wheel housings together with the side frame, bearing sleeve and slide shaft therefor.

Fig. 6 is a sectional view taken approximately on line 6—6 of Fig. 5.

Referring to the drawings, the spreader includes a container 10 having an open bottom 11, a rear wall 12, opposite side walls 13 and 14 and a forward wall 15 of lesser height than the side walls. The rear wall 12 is provided with a strike-off blade 16 which is adjustable towards and away from the area over which the spreader is moved for discharging the desired depth of aggregate beneath the strike-off blade as the spreader is pushed by a tractor.

The spreader is rollably supported at its forward end by wheels 18 which are independently adjustable horizontally and vertically for the purpose of maintaining the strike-off blade at all times in the same spaced relationship from the area on which the aggregate is to be spread. The wheels are also mounted on vertical axes for swinging movement for turning of the spreader to the right or left. The wheels have their axles 19 journalled for rotation in bearings 20 mounted in the opposite sides of housings 21. The axles 19 are disposed in lateral alignment and forwardly thereof the housings are formed with vertical shafts 23 which are journalled in bearings 24 mounted at the outer ends of side frames 25 arranged one at each side to extend forwardly of the container. The side frames 25 support the forward end of the container and extend into supported relation at their forward ends on the housings of the wheels. The housings being thusly journalled in the bearings 24 permit of the swinging of the housings together with the wheels in angular relation with reference to the side frames for turning the spreader to the right or left. The side frames extend angularly downward with the lower ends thereof provided with sleeves 26 which are affixed thereto with the sleeves in the opposite side frames disposed in alignment. Affixed in the sleeves 26 are shafts 27 mounted at their inner ends in bearing sleeves 28 which are welded or otherwise affixed to the bottom of the forward wall 15 of the container 10. The shafts 27 are slidably mounted in the bearing sleeves 28 for independent lateral movement of the wheels from the inner position shown in Fig. 2 of the drawings to the outer position shown in Fig. 3 thereof. The shafts 27 are formed with inner and outer peripheral grooves 29 and 30, the grooves 29 in the shafts being engaged by set screws 31 extending through threaded openings in the bearing sleeves 28 for retaining the shafts 27 together with the wheels 18 in the normal or inner position shown in Fig. 2 of the drawings and when the wheels are moved to the outer position shown in Fig. 3 of the drawings, the set screws 31 engage in the grooves 30 so as to retain the wheels in said outer position.

The side frames 25 are vertically rockable on the shafts 27 to dispose either one of the wheels at a higher elevation than the other and for this purpose turnbuckles are provided which are pivotally connected at their ends with the side frames and with the container. The sleeves 34 of the turnbuckles threadedly engage right and left hand threaded rods 35 and 36 which rods are formed with clevises 37 and 38 respectively. The clevis 37 of each of the rods 35 engages an apertured ear 39 which is welded or otherwise affixed to the side of the container and with a bolt 40 extending through the clevis and ear pivotally connecting the turnbuckle to the container. The clevis 38 of each of the rods 36 optionally engages apertured ears 41 and 42 affixed to the top of the side frame and with a bolt 43 extending through the clevis and apertured ear for pivotally securing the rod to the side frame. The clevises engage the ears 41 when the housing and wheels are in the inner position shown in Fig. 2 of the drawings and when either one of the wheels is to be moved to the outer position shown in Fig. 3 of the drawings, the clevis 38 thereof is shifted to engage the ear 42. It will be understood that turning of the sleeve 34 in one direction will shorten the overall length of the turnbuckle so as to swing the side frame together with the wheel upwardly about the shaft 27 as a center. Thus, either one of the wheels may be adjusted to the desired elevation so as to maintain the bottom of the strike-off blade in the desired spaced relation from the surface of the area on which the aggregate is to be spread.

The side frames 25 are of any preferred construction and for manufacturing purposes the same preferably are made up of a vertical plate 45 to which side flanges 46 are welded or otherwise affixed intermediate the width thereof. The plate 45 of each of the side frames is welded to the bearing 24 and sleeve 26 thereof and the ears 41 and 42 are welded to the flanges 46 respectively on opposite sides of the plate 45.

It is to be understood that the spreader is pushed forwardly as by a tractor pushing against the rear wall thereof. The forward movement pushes the aggregate within the container forwardly therewith with the exception of the layer thereof spread on the base and discharged beneath the strike-off blade on which the tractor travels. The spreader is loaded with aggregate dumped from a dump truck and for this purpose the forward wall 15 is provided with rollers 48 journalled for turning movement in brackets 49 affixed to the forward face of the forward wall.

In pushing the spreader, the push beam 50 of the tractor is releasably connected to bracket members 51 and 52 rigidly affixed to the container to project rearwardly therefrom. The push beam 50 and bracket members 51 and 52 are provided with interengageable means such as the pins 53 for releasably connecting the same together. The motion of the tractor is imparted to the spreader through the push beam 50.

While the preferred form of the invention is shown and described herein, it is to be understood that the same is not so limited but shall cover and include any and all modifications of the invention which fall within the purview thereof.

What is claimed is:

1. In a spreader of the character described, a container having an open bottom, upwardly directed side frames extending forwardly of the container, a wheel arranged one on each side rollably supporting the forward end of the container, means mounting said wheels to the forward upper ends of said side frames respectively for rolling movement on transversely extending axes and for independent swivel turning movement on vertical axes arranged with the vertical axes disposed forwardly of the transversely extending axes, means pivotally connecting the lower rear ends of said side frames to the forward end of the container for swinging movement of either one of the side frames in a vertical plane for varying the elevation of either one of said wheels, said last mentioned axes including laterally extending shafts journaled in bearings carried by said container in which bearings said shafts are movable from an inner position to an outer position for varying the spacing of said wheels, and adjustable turnbuckle means connecting the forward upper ends of said side frames and the upper portion of the forward end of the container for independently swinging either one of said side frames on its pivotal connection with the container for varying the elevation of either one of said wheels with reference to the bottom of the container and for rigidly retaining the wheels in the adjusted elevation to thereby maintain the container in a substantially horizontal relation when the bed on which either one of the wheels travels is at a different elevation than the other.

2. In a spreader of the character described, a container having an open bottom, upwardly directed side frames extending forwardly of the container, a wheel arranged one on each side rollably supporting the forward end of the container, means mounting said wheels to the forward upper ends of said side frames respectively for rolling movement on transversely extending axes and for independent swivel turning movement on vertical axes arranged with the vertical axes disposed forwardly of the transversely extending axes, laterally extending shafts swingably connecting the lower ends of said side frames to the forward end of the container for swinging movement of either one of the side frames in a vertical plane for varying the elevation of either one of said wheels, and adjustable means connecting the forward upper ends of said side frames and the upper portion of the forward end of the container for independently swinging either one of said side frames on its pivotal connection with the container for varying the elevation of either one of said wheels with reference to the bottom of the container and for rigidly retaining the wheels in the adjusted elevation to thereby maintain the container in a substantially horizontal relation when the bed on which either one of the wheels travels is at a different elevation than the other.

References Cited in the file of this patent

UNITED STATES PATENTS

| | | |
|---|---|---|
| 2,092,458 | Krout | Sept. 7, 1937 |
| 2,093,766 | Rich | Sept. 21, 1937 |
| 2,227,762 | Ronning | Jan. 7, 1941 |
| 2,303,486 | McConnaughay | Dec. 1, 1942 |
| 2,502,309 | Byrd | Mar. 28, 1950 |
| 2,631,863 | Tranter et al. | Mar. 17, 1953 |
| 2,757,587 | Mentes | Aug. 7, 1956 |